United States Patent Office

3,658,742
Patented Apr. 25, 1972

3,658,742
AQUEOUS TETRAFLUOROETHYLENE TELOMER DISPERSIONS
Frank H. Fish, Westwood, Irwin W. Fischbein, Canton, and Mandel E. Slater, Randolph, Mass., assignors to The Gillette Company, Boston, Mass.
No Drawing. Filed Oct. 7, 1968, Ser. No. 765,693
Int. Cl. C08f 47/18, 47/20
U.S. Cl. 260—29.6 F
5 Claims

ABSTRACT OF THE DISCLOSURE

The present invention relates to aqueous dispersions of tetrafluoroethylene telomers and to processes for preparing such aqueous dispersions from dispersions of such telomer in trichlorotrifluoroethane mediums. In general, the processes for preparing such aqueous dispersions comprise adding a solvent which is both miscible with water and the trichlorfluoroethane to the trichlorotrifluoroethane dispersion, removing the trichlorofluoroethane, e.g., by evaporation, and mixing the resulting dispersion with water in the presence of a suitable wetting agent.

---

Processes for preparing dispersions of tetrafluoroethylene telomers in trichlorotrifluoroethane mediums are disclosed in patents such as U.S. Pat. No. 3,067,262. Generally, such processes comprise polymerizing tetrafluoroethylene in the presence of a free radical catalyst and an active telogen in a medium of trichlorotrifluoroethane, i.e., either 1,1,1-trichloro-2,2,2 trifluoroethane or 1,1,2 trichloro-1,2,2-trifluoroethane. In such polymerizations, the trichlorotrifluoroethanes partake in the reaction and provide the terminal or end groups of the telomer. Generally, the telomers which are produced are wax-like solids and are useful as lubricants, mold-release agents and surface coatings. They have been found particularly useful as razor blade coatings such as disclosed in copending U.S. application, Ser. No. 384,805, which was filed July 23, 1964 in the name of Irwin W. Fischbein. For many applications, the telomers can be used in the form of the trichlorotrifluoroethane dispersion and they are usually available commercially in such form. In certain instances, however, such as when the telomers are to be applied by spray coating techniques, it is more desirable that they be dispersed in water rather than in the trichlorofluoroethanes. The present invention is concerned with providing processes for preparing such aqueous dispersions.

Various methods have been proposed in the past for preparing aqueous dispersions of tetrafluoroethylene telomers from dispersions of such telomers in trichlorotrifluoroethanes. One such method comprises mixing the trichlorotrifluoroethane telomer dispersion directly with water and a wetting agent. Although this method provides useful dispersions, it leaves something to be desired in that a substantial portion, e.g., sometimes at least 50%, of the expensive telomer is lost. Still another method comprises adding the trichlorotrifluoroethane dispersions directly to water and a wetting agent as set forth above and then removing the trichlorotrifluoroethane. Although this method substantially eliminates the losses of expensive telomer, the stability of the resulting dispersion leaves something to be desired. The dispersions produced usually have short shelf lives and often clog the spray equipment when they are applied from such apparatus.

It is an object of the present invention to produce aqueous dispersions of tetrafluoroethylene telomers which can be sprayed readily and for prolonged periods without plugging the fluid passages of a spray gun. Another object is to prepare an aqueous dispersion of tetrafluoroethylene telomer according to a method that will minimize losses of the telomer solids in the preparation. Still another object is to put the tetrafluoroethylene telomer into a form that has a long shelf life and yet requires little additional processing before it can be converted to an aqueous dispersion suitable for spray coating. Other objects of our invention will be apparent from the following detailed description and claims.

In the present invention, improved methods have been discovered for preparing aqueous dispersions of tetrafluoroethylene telomers from dispersions of such telomers in trichlorotrifluoroethanes. In accordance with one invention, the telomer dispersed in trichlorotrifluoroethane is combined with a solvent or carrier that is miscible both with the trichlorotrifluoroethanes and with water. The trichlorotrifluoroethane is removed preferably by evaporation and the resulting dispersion of the telomer in the water-miscible, trichlorotrifluoroethane-miscible carrier is mixed with appropriate quantities of water in the presence of a wetting agent.

The water-miscible, trichlorofluoroethane-miscible solvents or carriers for use in the present invention may be selected from the various materials of this nature available. It is preferable, though not essential, that the solvent have a higher boiling point than the trichlorotrifluoroethane so that the latter may be removed conveniently by evaporation. Losses of solvent during the evaporation of the trichlorofluoroethane may be made up by simple additions of such solvent during or subsequent to the evaporation step. As examples of water-miscible, tricholotrifluoroethane-miscible solvents, mention may be made of lower aliphatic alcohols, i.e., containing less than 5 carbon atoms such as methanol, ethanol, isopropanol, and tert.-butanol; aliphatic ketones containing less than 5 carbon atoms such as acetone and methyl ethyl ketone; aliphatic nitriles containing less than 4 carbon atoms, e.g., propionitrile and acetonitrile; and cyclic and non-cyclic aliphatic diethers such as dioxane and dimethoxyethane. The concentration of the telomer in the water-miscible, trichlorotrifluoroethane-miscible carriers may be varied to suit particular needs. Usually, when the concentration goes above about 15 to 20%, the dispersion becomes thick and jelly-like and difficult to handle. For ease of handling, a concentration of about 6 to 10% is preferred. Lower concentrations, of course, may be used but they have no advantage and occupy more volume.

Generally, the wetting agents for use in the present invention may be selected from the various surface active materials which are available for use in aqueous, polymeric dispersions. Such wetting agents include alkali metal salts of dialkyl sulfosuccinates, soaps of higher fatty acids, fatty amines, sorbitan mono- and di-esters of fatty acids and their polyoxyalkyleneether derivatives, alkali metal salts of alkylarylsulfonates, polyalkyleneether glycols and the mono- and di-fatty acid esters of said glycols. The preferred wetting agents for use in the present invention are the non-ionics and more particularly the alkylphenylpolyalkyleneether alcohols such as Triton X–100 and Triton X–114 sold by Rohm & Haas Co., Ipegal CO–610 sold by General Aniline and Film Co. and Tergitol 12P12 sold by Union Carbide Company. Especially useful results have been obtained with the Tergitol 12P12 which is a dodecylphenylpolyethyleneether alcohol containing 12 ethylene oxide groups. Generally, the amount of wetting agent employed may be varied. Usually, the wetting agent is used in amounts equal to at least about 5% by weight of the tetrafluoroethylene telomer. In preferred embodiments, the wetting agent is used in amounts ranging between about 5% to about 50% by weight of the telomer. Particularly good results were obtained using between about 5% to about 25%.

Generally, the time at which the wetting agent is added to the system is not critical. Thus, it can be added (1) at the time the trichlorotrifluoroethane telomer dispersion is added to the water-miscible trichlorotrifluoroethane-miscible solvent, (2) after the trichlorotrifluoroethane has been removed, or (3) when the water-miscible, trichlorotrifluoroethane-miscible telomer dispersion is added to water. The first of these alternatives has been found to be the most useful.

The processes of the present invention have been found to be particularly useful for preparing dilute, e.g., 0.25% to about 4% aqueous dispersions of the telomer. In preferred embodiments, the resulting aqueous dispersions comprise up to about 1% of telomer. As can be appreciated, the lower limit of the preferred range may be varied to suit particular needs. Generally, such lower limit will be dictated by the end use to which the dispersion is to be put.

In end uses such as spray coating, it has been found best to prepare the aqueous dispersions on the day they are to be used. Once prepared, some of the better aqueous dispersions are stable for several days. For convenience, the telomers are best stored as dispersions in the water-miscible, trichlorotrifluoroethane-miscible solvent or carrier. In such form, the telomers have been stored for considerable periods of time without noticeable deleterious effects on their ability to produce useful aqueous dispersions upon being added to water.

The following non-limiting example illustrates the processes of the present invention:

EXAMPLE 1

Isopropanol (906 gm.) and Triton X–100 (19 gm.) were weighed into a three-liter distilling flask. The volume occupied by the combined materials was marked on the flask. One thousand gm. of tetrafluoroethylene telomer dispersion in 1,2,2-trichloro-1,1,2-trifluoroethane (containing 7½% by weight of the tetrafluoroethylene telomer) was then added, and the flask was connected to a vacuum source. The 1,2,2-trichloro-1,1,2-trifluoroethane was evaporated by heating under vacuum, with vigorous stirring, until the volume mark was reached. Five hundred ml. of isopropanol was then added, and the evaporation was continued until the volume mark was reached again. The resulting isopropanol dispersion comprised 7½% by weight tetrafluoroethylene telomer and 1⅞% by weight of Triton X–100.

A stable aqueous telomer dispersion containing 0.4% by weight telomer and 0.1% by weight wetting agent was prepared by stirring together 53.3 gm. of the above isopropanol dispersion and 947 gm. water. The percentage of isopropanol in the resulting aqueous dispersion was 4.8% by weight.

Other useful dispersions were made in a manner similar to Example 1 by using in place of the isopropanol, the following solvents: methanol, ethanol, tertiary butanol, methyl ethyl ketone, dimethoxyethane, dioxane and acetonitrile.

EXAMPLE 2

0.32 gm. of Tergitol 12P12, 60 gm. of a 7½% polytetrafluoroethylene dispersion in trichlorotrifluoroethane and 100 gms. of isopropyl alcohol were weighed into a one liter round-bottom, single-necked flask. The flask was connected to a rotary evaporator and the trichlorotrifluoroethane was stripped off in a water bath at 45° C. using a water aspirator. The evaporation was carried out for about ten minutes until the contents of the flask become noticeably viscous. When the resulting isopropanol dispersion comprising about 7½% of polytetrafluoroethylene was diluted with water to about 1/20 its concentration, a stable aqueous dispersion was obtained.

The aqueous dispersions of the present invention have been found particularly useful for spray coating razor blades and especally for spray coating razor blades using electrostatic techniques.

Having thus described the invention, what is claimed is:

1. A method of preparing an aqueous dispersion of tetrafluoroethylene telomer from a dispersion of said telomer in a trichlorotrifluoroethane medium, said process comprising combining said dispersion of telomer in the trichlorotrifluoroethane medium with a solvent which is miscible with both said trichlorotrifluoroethane and with water, said solvent being present in amounts which are sufficient so that it may serve as the continuous phase of the dispersion, and being selected from the group consisting of lower aliphatic alcohols, aliphatic ketones containing less than 4 carbon atoms and cyclic and non-cyclic aliphatic di-ethers, evaporating off all of said trichlorotrifluoroethane to provide a dispersion of said telomer in said solvent and combining the dispersion of said telomer in said solvent with water in the presence of a non-ionic wetting agent, said wetting agent present in an amount of at least 5% by weight of telomer present.

2. A method as defined in claim 1 wherein said non-ionic wetting agent is an alkylphenylpolyalkyleneether alcohol.

3. A method as defined in claim 1 wherein said aqueous dispersion comprises between about 0.25% to about 4% by weight of said tetrafluoroethylene telomer.

4. A method as defined in claim 1 wherein said solvent is a lower aliphatic alcohol.

5. A method as defined in claim 1 wherein said non-ionic wetting agent is present in amounts ranging from about 5% to about 50% by weight of the telomer present.

References Cited
UNITED STATES PATENTS

| | | | |
|---|---|---|---|
| 2,686,767 | 8/1954 | Green | 260—29.6 F |
| 2,775,569 | 12/1956 | Dipner et al. | 260—29.6 F |
| 2,940,874 | 6/1960 | Barnes | 260—29.6 F |
| 3,067,262 | 12/1962 | Brady | 106—10 |
| 3,105,824 | 10/1963 | Green et al. | 260—29.6 F |
| 3,316,201 | 4/1967 | Hahn et al. | 260—29.6 F |
| 2,876,131 | 3/1959 | Kumnick et al. | 260—92.1 S X |

JULIUS FROME, Primary Examiner

D. A. JACKSON, Assistant Examiner

U.S. Cl. X.R.

260—29.6 PM, 92.1 S